United States Patent
Wolowicz (10) Patent No.: US 12,516,841 B2
(45) Date of Patent: Jan. 6, 2026

(54) SYSTEM AND METHOD FOR IMPROVING INDOOR AIR QUALITY

(71) Applicant: Lennox Industries Inc., Richardson, TX (US)

(72) Inventor: Thomas John Wolowicz, Allen, TX (US)

(73) Assignee: Lennox Industries Inc., Richardson, TX (US)

( * ) Notice: Subject to any disclaimer, the term of this patent is extended or adjusted under 35 U.S.C. 154(b) by 377 days.

(21) Appl. No.: 18/347,730

(22) Filed: Jul. 6, 2023

(65) Prior Publication Data

US 2025/0012474 A1    Jan. 9, 2025

(51) Int. Cl.
*F24F 11/74* (2018.01)
*F24F 11/61* (2018.01)
*F24F 11/64* (2018.01)
*F24F 110/30* (2018.01)

(52) U.S. Cl.
CPC .............. *F24F 11/74* (2018.01); *F24F 11/61* (2018.01); *F24F 11/64* (2018.01); *F24F 2110/30* (2018.01)

(58) Field of Classification Search
CPC .. F24F 11/74; F24F 11/64; F24F 11/61; F24F 2110/30
See application file for complete search history.

(56) References Cited

U.S. PATENT DOCUMENTS

| | | | |
|---|---|---|---|
| 2007/0155305 A1* | 7/2007 | Heidel | F24F 7/06 454/356 |
| 2008/0182506 A1* | 7/2008 | Jackson | F24F 11/64 454/354 |
| 2012/0204715 A1* | 8/2012 | Hagan | B01D 46/46 96/25 |
| 2012/0247326 A1* | 10/2012 | Storm | F24F 8/192 96/25 |
| 2017/0028333 A1* | 2/2017 | Takei | F24F 11/64 |
| 2022/0170651 A1* | 6/2022 | Martensen | F24F 8/22 |
| 2022/0404056 A1* | 12/2022 | Bloemer | F24F 11/58 |
| 2023/0375208 A1* | 11/2023 | Paiho | F24F 11/39 |
| 2024/0247833 A1* | 7/2024 | Ramasamy | F24F 11/89 |

\* cited by examiner

*Primary Examiner* — Mohammad Ali
*Assistant Examiner* — Vincent W Chang
(74) *Attorney, Agent, or Firm* — Baker Botts L.L.P.

(57) ABSTRACT

A method includes setting a desired cleaning time and desired air changes. A volume of a controlled space is determined. A total clean air volume to be delivered to the controlled space is determined based on the volume and the desired air changes. (a) A remaining clean air volume to be delivered to the controlled space is determined. (b) A remaining cleaning time is determined. (c) In response to determining that a ventilation unit is not present: a recirculated air flow rate is determined based on the remaining clean air volume and the remaining cleaning time, a blower flow rate is set to the determined recirculated air flow rate, the method waits for an idle time, and a delivered clean air volume already delivered to the controlled space is determined. Operations (a), (b), and (c) are repeated until the total clean air volume is delivered to the controlled space.

20 Claims, 5 Drawing Sheets

SYSTEM AND METHOD FOR IMPROVING INDOOR AIR QUALITY

TECHNICAL FIELD

The present disclosure relates generally to air quality control in residential or commercial buildings, and more specifically to a Heating, Ventilation, and Air Conditioning (HVAC) system configured to improve indoor air quality.

BACKGROUND

Existing heating, ventilation, and air conditioning (HVAC) systems are generally configured to control a temperature of a controlled space (e.g., a room, a home, an apartment, a mall, an office, a warehouse, or a building). Existing heating and cooling operation modes of HVAC systems do not achieve a desired indoor air quality (TAQ) of the controlled space.

SUMMARY

The system disclosed in the present application provides a technical solution to the technical problems discussed above by providing a Heating, Ventilation, and Air Conditioning (HVAC) system configured to improve indoor air quality.

In general, the HVAC system is configured to improve indoor air quality (IAQ) of a controlled space (e.g., a room, a home, an apartment, a mall, an office, a warehouse, or a building). The IAQ of the controlled space may be affected by viruses from one or more occupants that have viral infections, smoke and gases from kitchen appliances and candles, microparticles, pollen, dust, or the like. The IAQ of the controlled space may be improved by introducing a clean ventilated air and/or a conditioned filtered air to the controlled space. A filter is configured to remove contaminants (e.g., viruses, gases, smoke, microparticles, pollen, dust, or the like) from the conditioned filtered air.

A thermostat of the HVAC system is configured to perform a desired air cleaning process and improve the IAQ of the controlled space by choosing a desired air cleaning mode. The desired air cleaning mode may be a purge mode, a continuous mode, a scheduled mode, or a fixed-duration mode.

While performing an air cleaning process in a purge mode, the thermostat sets a cleaning time to one hour and air changes per hour (ACH) to a desired value. The thermostat determines a volume of the controlled space, a total clean air volume to be delivered to the controlled space, a remaining clean air volume to be delivered to the controlled space, and a remaining cleaning time. The thermostat further determines if a ventilation unit is present in the HVAC system.

In response to determining that the ventilation unit is not present in the HVAC system, the thermostat determines a recirculated air flow rate based on the remaining clean air volume and the remaining cleaning time. In response to determining that the ventilation unit is present in the HVAC system, the thermostat determines a ventilated air flow rate and determines the recirculated air flow rate based on the remaining clean air volume, the determined ventilated air flow rate, and the remaining cleaning time.

Thermostat sets a ventilation unit flow rate to the determined ventilated air flow rate and a blower flow rate to the determined recirculated air flow rate. The thermostat waits for an idle time. By waiting for the idle time, the air cleaning process allows the thermostat to perform various operations based on comfort demands of a user. In certain embodiments, the blower flow rate does not remain unchanged during the idle time depending on comfort demands of the user. For example, if a cooling demand has been met, the thermostat may instruct a blower of the HVAC system to reduce the blower flow rate. For another example, if the blower flow rate is not sufficient to meet the desired cooling demand, the thermostat may instruct the blower to increase the blower flow rate.

The thermostat determines a delivered clean air volume and determines if the total clean air volume is delivered to the controlled space. In response to determining that the total clean air volume is not delivered to the controlled space, the above operations may be repeated one or more times until the total clean air volume is delivered to the controlled space.

While performing an air cleaning process in a continuous mode, the thermostat may repeat the air cleaning process in the purge mode one or more times until an instruction to stop the air cleaning process is received by the thermostat.

While performing an air cleaning process in a scheduled mode, the thermostat sets a desired start date and a desired start time. The thermostat determines a current date. In response to determining that the current date matches the desired start date, the thermostat determines a current time. In response to determining that the current time matches the desired start time, the thermostat performs the air cleaning process in the purge mode.

While performing an air cleaning process in a fixed-duration mode, thermostat performs operations similar to operations performed in the purge mode. In distinction with the purge mode, the thermostat sets a desired cleaning time and a desired air changes (AC) in fixed-duration mode.

The HVAC system described herein allows for performing air clearing processes in various modes and improving the IAQ of a controlled space by introducing a clean ventilated air and/or a conditioned filtered air to the controlled space. The air clearing processes remove contaminants (e.g., viruses, gases, smoke, microparticles, pollen, dust, or the like) from the controlled space.

In one embodiment, a system includes a thermostat communicatively coupled a heating, ventilation, and air conditioning (HVAC) system. The thermostat includes a memory configured to store an idle time and a processor communicatively coupled to the memory. The processor is configured to set a desired cleaning time, set desired air changes, determine a volume of a controlled space, determine a total clean air volume to be delivered to the controlled space based on the volume of the controlled space and the desired air changes, (a) determine a remaining clean air volume to be delivered to the controlled space, (b) determine a remaining cleaning time; and (c) in response to determining that a ventilation unit is not present in the HVAC system: determine a recirculated air flow rate based on the remaining clean air volume and the remaining cleaning time, set a blower flow rate to the determined recirculated air flow rate, wait for the idle time, and determine a delivered clean air volume already delivered to the controlled space. The processor is further configured to repeat operations (a), (b), and (c) until the total clean air volume is delivered to the controlled space.

Certain embodiments of the present disclosure may include some, all, or none of these advantages. These advantages and other features will be more clearly under-

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
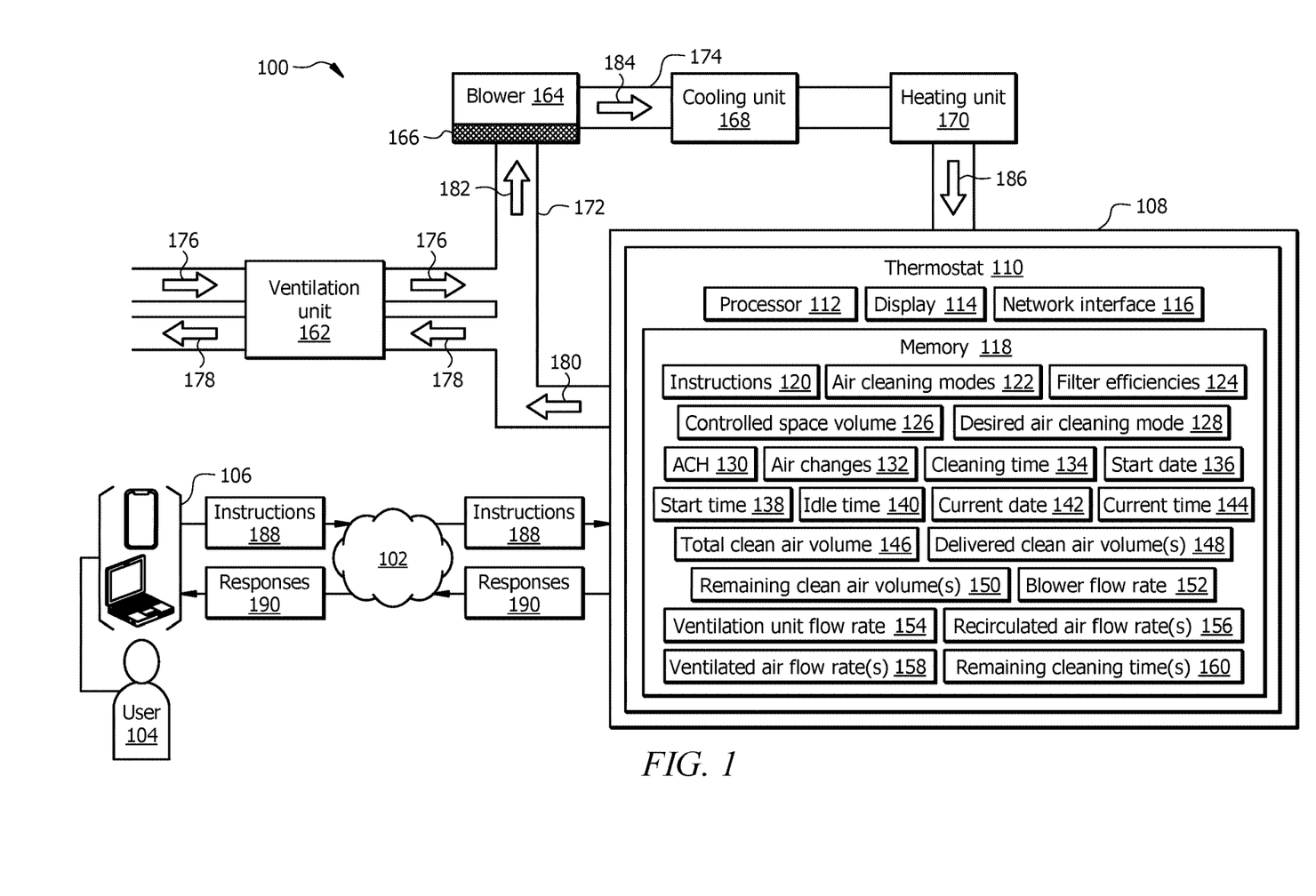
FIG. 1 is a schematic diagram of an embodiment of a Heating, Ventilation, and Air Conditioning (HVAC) system configured to improve indoor air quality.

FIG. 1 is a schematic diagram of an embodiment of a Heating, Ventilation, and Air Conditioning (HVAC) system 100 configured to improve indoor air quality (IAQ).

In certain embodiments embodiment, a user device 106 of a user 104 is communicatively coupled to a thermostat 110 of the HVAC system 100 over a network 102. Network 102 enables the communication between the user device 106 and the thermostat 110 of the HVAC system 100. In other embodiments, the HVAC system 100 may not have all the components listed and/or may have other elements instead of, or in addition to, those listed above.

In general, the HVAC system 100 is configured to improve the IAQ of a controlled space 108 (e.g., a room, a home, an apartment, a mall, an office, a warehouse, or a building). The IAQ of the controlled space 108 may be affected by viruses from one or more occupants that have viral infections, smoke and gases from kitchen appliances and candles, microparticles, pollen, dust, or the like. The IAQ of the controlled space may be improved by introducing a clean ventilated air and/or a conditioned filtered air to the controlled space. A filter 166 is configured to remove contaminants (e.g., viruses, gases, smoke, microparticles, pollen, dust, or the like) from the conditioned filtered air.

In operation, the thermostat 110 is configured to perform a desired air cleaning process and improve the IAQ of the controlled space 108 by choosing a desired air cleaning mode 128 from air cleaning modes 122. The air cleaning modes 122 include a purge mode, a continuous mode, a scheduled mode, and a fixed-duration mode.

While performing an air cleaning process in a purge mode, the thermostat 110 sets a cleaning time 134 to one hour and air changes per hour (ACH) 130 to a desired value. The desired ACH 130 may be in a range from 1 ACH to 6 ACH. The thermostat 110 determines a volume 126 of the controlled space 108, a total clean air volume 146 to be delivered to the controlled space 108, a remaining clean air volume 150 to be delivered to the controlled space 108, and a remaining cleaning time 160. The thermostat 110 determines if a ventilation unit 162 is present in the HVAC system 100.

In response to determining that the ventilation unit 162 is not present in the HVAC system 100, the thermostat 110 determines a recirculated air flow rate 156 based on the remaining clean air volume 150 and the remaining cleaning time 160.

In response to determining that the ventilation unit 162 is present in the HVAC system 100, the thermostat 110 determines a ventilated air flow rate 158 and a recirculated air flow rate 156 based on the remaining clean air volume 150, the determined ventilated air flow rate 158 and the remaining cleaning time 160.

Thermostat 110 sets a ventilation unit flow rate 154 to the determined ventilated air flow rate 158 and a blower flow rate 152 to the determined recirculated air flow rate 156.

The thermostat 110 waits for an idle time 140. The idle time 140 may be in a range from 1 min to 20 min. By waiting for the idle time 140, the air cleaning process allows the thermostat 110 to perform various operations based on comfort demands of the user 104. In certain embodiments, the blower flow rate 152 does not remain unchanged during the idle time 140 depending on comfort demands of the user 104. For example, if a cooling demand has been met, the thermostat 110 may instruct the blower 164 to reduce the blower flow rate 152. For another example, if the blower flow rate 152 is not sufficient to meet the desired cooling demand, the thermostat 110 may instruct the blower 164 to increase the blower flow rate 152.

The thermostat 110 determines a delivered clean air volume 148 and determines if the total clean air volume 146 is delivered to the controlled space 108. In response to determining that the total clean air volume 146 is not delivered to the controlled space 108, the above operations may be repeated one or more times until the total clean air volume 146 is delivered to the controlled space 108.

While performing an air cleaning process in a continuous mode, the thermostat 110 may repeat the air cleaning process in the purge mode one or more times until an instruction to stop the air cleaning process is received.

While performing an air cleaning process in a scheduled mode, the thermostat 110 sets a desired start date 136 and a desired start time 138. The thermostat 110 determines a current date 142. In response to determining the current date 142 matches the desired start date 136, the thermostat 110 determines a current time 144. In response to determining that the current time 144 matches the desired start time 138, the thermostat 110 performs the air cleaning process in the purge mode.

While performing an air cleaning process in a fixed-duration mode, thermostat 110 performs operations similar to operations performed in the purge mode. In distinction with the purge mode, the thermostat 110 sets a desired cleaning time 134 and a desired air changes (AC) 132 to desired values in fixed-duration mode. The desired AC 132 may be in a range from 1 AC to 6 AC.

System Components

Network

The network 102 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 102 may be configured to support any suitable type of communication protocol as would be appreciated by one of ordinary skill in the art.

User Device

The user device 106 is generally any device that is configured to process data and interact with the user 104. Examples of the user device 106 include, but are not limited to, a personal computer, a desktop computer, a workstation, a server, a laptop, a tablet computer, a mobile phone (such as a smartphone), etc. The user device 106 may include a user interface, such as a display, one or more cameras, one or more microphones, keypad, or other appropriate terminal equipment usable by the user 104.

The user device 106 may comprise a processor in signal communication with a memory and a network interface. The processor comprises one or more processors operably coupled to the memory. The one or more processors are configured to implement various instructions to implement various functions of the user device 106.

In operation, the device 106 is configured exchange various instructions (e.g., instructions 188) and responses (e.g., responses 190) with the thermostat 110 of the HVAC system 100.

HVAC System

An HVAC system 100 is generally configured to control a temperature of a controlled space 108. Examples of the controlled space 108 include, but are not limited to, a room, a home, an apartment, a mall, an office, a warehouse, or a building. Although FIG. 1 illustrates a single HVAC system 100, a location or space may comprise a plurality of HVAC systems 100 that are configured to work together. For example, a large building may comprise multiple HVAC systems 100 that work cooperatively to control the temperature within the building. The HVAC system 100 may be a residential HVAC system or a commercial HVAC system.

The HVAC system 100 is further configured to reduce an amount of contaminants in the controlled space 108 and improve indoor air quality (IAQ). The contaminants may be particles, viruses, pollen, dust, smoke, gases (for example, CO, $CO_2$, NO, $NO_2$, or the like), or the like. The thermostat 110 is configured to send instructions to components of the HVAC system 100 to perform air cleaning processes in various modes.

In some embodiments, the HVAC system 100 is a rooftop unit (RTU) that is positioned on the roof of a building, and the conditioned air is delivered to the interior of the building. In other embodiments, portion(s) of the HVAC system 100 may be located within the building and portion(s) outside the building. The HVAC system 100 may be configured as shown in FIG. 1 or in any other suitable configuration. For example, the HVAC system 100 may include additional components or may omit one or more components shown in FIG. 1.

The HVAC system 100 includes a working-fluid conduit subsystem (not shown), a ventilation unit 162, a blower 164, a filter 165, a cooling unit 168, and a heating unit 170. In embodiments when the HVAC system 100 is a residential HVAC system, the HVAC system 100 may not include the ventilation unit 162.

The working-fluid conduit subsystem facilitates the movement of a working fluid (e.g., a refrigerant) through cooling/heating cycles. The working fluid may be any acceptable working fluid including, but not limited to hydroflurocarbons (e.g., R-410A) or any other suitable type of refrigerant.

The ventilation unit 162 comprises a fan (not shown) and is configured to deliver ventilated air 176 to a return duct 172 from external environment and deliver exhaust air 178 to external environment from the return duct 172. Return air 182, which may be air returning from the controlled space 108, fresh air from external environment, or some combination, is pulled into the return duct 172. In the illustrated embodiment, the return air 182 comprises a combination of air 180 that is returning from the controlled space 108, the ventilated air 176, and the exhaust air 178. A suction side of the blower 164 pulls the return air 182 through the filter 166 and discharges filtered air 184 into a duct 174 such that the filtered air 184 crosses the cooling unit 168 and/or the heating unit 170 to produce conditioned filtered air 186. The conditioned filtered air 186 is then introduced into the controlled space 108. In certain embodiments, the ventilation unit 162 is a constant speed unit. The filter 166 is configured to remove contaminants (e.g., viruses, gases, smoke, microparticles, pollen, dust, or the like) from the return air 182 to produce the filtered air 184.

The blower 164 is any mechanism for providing airflow through the HVAC system 100. For example, the blower 164 may be a constant speed or variable speed circulation blower or fan. Examples of a variable speed blower include, but are not limited to, belt-drive blowers controlled by inverters, direct-drive blowers with electronic commuted motors (ECM), or any other suitable type of blower.

The cooling unit 168 includes various components (not shown), such as a compressor, a condenser, and a fan. In typical embodiments, the compressor is a variable speed compressor that can be operated at a range of speeds. The compressor is coupled to the working-fluid conduit subsystem and compresses (i.e., increases the pressure of) the working fluid.

The condenser is configured to facilitate movement of the working fluid through the working-fluid conduit subsystem. The condenser is generally located downstream of the compressor and is configured to remove heat from the working fluid. The fan is configured to move air across the condenser. For example, the fan may be configured to blow outside air through the condenser to help cool the working fluid flowing therethrough. The compressed, cooled working fluid flows from the condenser to the evaporator.

The evaporator is generally any heat exchanger configured to provide heat transfer between air flowing through (or across) the evaporator (i.e., airflow contacting an outer surface of one or more coils of the evaporator) and working fluid passing through the interior of the evaporator. The evaporator may include one or more circuits of coils. The evaporator is fluidically connected to the compressor, such that working fluid generally flows from the evaporator to the condensing unit when the HVAC system 100 is operating to provide cooling.

The heating unit 170 includes various components, such as a furnace and one or more coils. The heating unit 170 is configured to provide heat transfer between air flowing through (or across) the heating unit 170 (i.e., airflow contacting an outer surface of one or more coils) when the HVAC system 100 is operating to provide heating.

Components of the HVAC system 100 are in signal communication with one or more thermostats 110 using wired and/or wireless connection. The thermostat 110 may be located within the controlled space 108. The thermostat 110 may be a single-stage thermostat, a multi-stage thermostat, or any suitable type of thermostat as would be appreciated by one of ordinary skill in the art. The thermostat 110 is configured to allow the user 104 to input a desired temperature or temperature set point for the controlled space 108. The thermostat 110 is further configured to allow the user 104 to choose various modes of an air cleaning process.

In operation, the HVAC system 100 is configured to improve the IAQ of the controlled space 108. The IAQ of the controlled space 108 may be affected by viruses from one or more occupants that have viral infections, smoke and gases from kitchen appliances and candles, microparticles, pollen, dust, or the like. The IAQ of the controlled space 108 may be improved by introducing the clean ventilated air 176 and the conditioned filtered air 186 to the controlled space 108. The filter 166 is configured to remove contaminants (e.g., viruses, gases, smoke, microparticles, pollen, dust, or the like) from the return air 182 to produce the filtered air 184.

Thermostat

The thermostat 110 is generally configured to control various operations of the HVAC system 100. In one embodiment, the thermostat 110 comprises a processor 112 in signal communication with a display 114, a memory 118 and a network interface 116.

The display 114 is a graphical user interface that is configured to present visual information using graphical objects. Examples of the display 114 include, but are not limited to, a liquid crystal display (LCD), a liquid crystal on silicon (LCOS) display, a light-emitting diode (LED) display, an active-matrix OLED (AMOLED), an organic LED (OLED) display, a projector display, or any other suitable type of display as would be appreciated by one of ordinary skill in the art. The display 114 may be configured to have touch screen functionality.

The processor 112 comprises one or more processors operably coupled to the memory 118. The processor 112 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 112 may be a programmable logic device, a microcontroller, a microprocessor, or any suitable combination of the preceding. The processor 112 is communicatively coupled to and is in signal communication with the memory 118 and the network interface 116. The one or more processors are configured to process data and may be implemented in hardware or software. For example, the processor 112 may be 8-bit, 16-bit, 32-bit, 64-bit, or of any other suitable architecture. The processor 112 is configured to implement various instructions. For example, the processor 112 is configured to execute instructions 120 to implement various functions of the thermostat 110.

The network interface 116 is configured to enable wired and/or wireless communications. The network interface 116 is configured to communicate data between the thermostat 110, the user device 106 and components of the HVAC system 100. For example, the network interface 116 may comprise an NFC interface, a Bluetooth interface, a Zigbee interface, a Z-wave interface, an RFID interface, a WIFI interface, a LAN interface, a WAN interface, a PAN interface, a modem, a switch, or a router. The processor 112 is configured to send and receive data using the network interface 116. The network interface 116 may be configured to use any suitable type of communication protocol as would be appreciated by one of ordinary skill in the art.

The memory 118 comprises one or more disks, tape drives, or solid-state drives, and may be used as an over-flow data storage device, to store programs when such programs are selected for execution, and to store instructions and data that are read during program execution. The memory 118 may be volatile or non-volatile and may comprise a read-only memory (ROM), random-access memory (RAM), ternary content-addressable memory (TCAM), dynamic random-access memory (DRAM), and static random-access memory (SRAM). The memory 118 is operable to store any of the information described herein with respect to FIGS. 1 through 6 along with any other data, instructions, logic, rules, or code operable to implement the function(s) described herein when executed by the processor 112. The memory 118 is operable to store the instructions 120 and/or any other data or instructions that is used by the processor 112 to perform the function(s) of the thermostat 110 described herein. The instructions 120 may comprise any suitable set of instructions, logic, rules, or code operable to implement the function(s) of the thermostat 110 when executed by the processor 112.

In certain embodiments, the memory 118 may further store various parameters that is used by the thermostat 110 to perform air cleaning processes. The parameters may include air cleaning modes 122, filter efficiencies 124, a controlled space volume 126, a desired air cleaning mode 128, air changes per hour (ACH) 130, air changes (AC) 132, a cleaning time 134, a start date 136, a start time 138, an idle time 140, a current date 142, a current time 144, a total clean air volume 146, delivered clean air volumes 148, remaining clean air volumes 150, a blower flow rate 152, a ventilation unit flow rate 154, recirculated air flow rates 156, ventilated air flow rates 158, and remaining cleaning times 160. These parameters are described below in greater detail.

In operation, the thermostat 110 is configured to perform a desired air cleaning process and improve the IAQ of the controlled space 108. The thermostat 110 is configured to perform the desired air cleaning process by choosing a desired air cleaning mode 128 from air cleaning modes 122. The air cleaning modes 122 include a purge mode, a continuous mode, a scheduled mode, and a fixed-duration mode. In certain embodiments, the user 104 may chose the desired air cleaning mode 128 from the air cleaning modes 122 displayed by the display 114 of the thermostat 110. In other embodiments, the user device 106 of the user 104 sends an instruction 188 to the thermostat 110. The instruction 188 instructs the thermostat 110 to choose the desired air cleaning mode 128 from the air cleaning modes 122.

While performing an air cleaning process in a purge mode, the processor 112 of the thermostat 110 sets a cleaning time 134 to one hour. The processor 112 of the thermostat 110 sets a desired air changes per hour (ACH) 130. The desired ACH 130 may be in a range from 1 ACH to 6 ACH. In certain embodiments, the processor 112 of the thermostat 110 sets the desired ACH 130 in response to the user 104 choosing the desired ACH 130 on the display 114 of the thermostat 110. In other embodiments, the processor 112 of the thermostat 110 sets the desired ACH 130 in response to receiving from the user device 106 of the user 104 an instruction 188 to set the desired ACH 130.

The processor 112 of the thermostat 110 determines a volume 126 of the controlled space 108. In certain embodiments, the processor 112 of the thermostat 110 reads the volume 126 of the controlled space 108 from the memory 118 of the thermostat 110. In other embodiments, the processor 112 of the thermostat 110 determines the volume 126 of the controlled space 108 by multiplying an area of the controlled space 108 by a ceiling height of the controlled space 108.

The processor 112 of the thermostat 110 determines a total clean air volume 146 to be delivered to the controlled space 108. In certain embodiments, the total clean air volume 146 is determined from Equation 1

$$V_t = V_s \times ACH \times T_c,$$

where $V_t$ is the total clean air volume 146, $V_s$ is the volume 126 of the controlled space 108, ACH is the desired ACH 130, and $T_c$ is the cleaning time 134.

The processor 112 of the thermostat 110 determines a remaining clean air volume 150 to be delivered to the controlled space 108. The remaining clean air volume 150 is determined by subtracting a delivered clean air volume 148 from the total clean air volume 146.

The processor 112 of the thermostat 110 determines a remaining cleaning time 160. The processor 112 of the thermostat 110 determines if a ventilation unit 162 is present in the HVAC system 100.

In response to determining that the ventilation unit 162 is not present in the HVAC system 100, the processor 112 of the thermostat 110 determines a recirculated air flow rate 156 based on the remaining clean air volume 150 and the remaining cleaning time 160. In certain embodiments, the recirculated air flow rate 156 may be determined from Equation 2

$$V_r = FE \times R_r \times T_r,$$

where $V_r$ is the remaining clean air volume 150, FE is a filter efficiency 124 of the filter 166, $R_r$ is the recirculated air flow rate 156, and $T_r$ is the remaining cleaning time 160.

In response to determining that the ventilation unit 162 is present in the HVAC system 100, the processor 112 of the thermostat 110 determines a ventilated air flow rate 158. In certain embodiments when the ventilation unit 162 is a fixed flow rate unit, the processor 112 of the thermostat 110 reads the ventilated air flow rate 158 from the memory 118 of the thermostat 110.

In response to determining that the ventilation unit 162 is present in the HVAC system 100, the processor 112 of the thermostat 110 determines the recirculated air flow rate 156 based on the remaining clean air volume 150, the determined ventilated air flow rate 158 and the remaining cleaning time 160. In certain embodiments, the recirculated air flow rate 156 may be determined from Equation 3

$$V_r = R_v \times T_r + FE \times R_r \times T_r,$$

where $V_r$ is the remaining clean air volume 150, FE is the filter efficiency 124 of the filter 166, $R_r$ is the recirculated air flow rate 156, $R_v$ is the ventilated air flow rate 158, and $T_r$ is the remaining cleaning time 160.

The processor 112 of the thermostat 110 sets a ventilation unit flow rate 154 to the determined ventilated air flow rate 158 and a blower flow rate 152 to the determined recirculated air flow rate 156. The processor 112 of the thermostat 110 waits for an idle time 140. The idle time 140 may be in a range from 1 min to 20 min. By waiting for the idle time 140, the air cleaning process allows the thermostat 110 to perform various operations based on comfort demands of the user 104. In certain embodiments, the blower flow rate 152 does not remain unchanged during the idle time 140 depending on comfort demands of the user 104. For example, if a cooling demand has been met, the processor 112 of the thermostat 110 may instruct the blower 164 to reduce the blower flow rate 152. For another example, if the blower flow rate 152 is not sufficient to meet the desired cooling demand, the processor 112 of the thermostat 110 may instruct the blower 164 to increase the blower flow rate 152.

The processor 112 of the thermostat 110 determines a delivered clean air volume 148. The processor 112 of the thermostat 110 determines if the total clean air volume 146 is delivered into the controlled space 108. In response to determining that the total clean air volume 146 is not delivered into the controlled space 108, the above operations may be repeated one or more times until the total clean air volume 146 is delivered to the controlled space 108.

While performing an air cleaning process in a continuous mode, the processor 112 of the thermostat 110 may repeat the air cleaning process in the purge mode one or more times until an instruction to stop the air cleaning process is received.

While performing an air cleaning process in a scheduled mode, the processor 112 of the thermostat 110 sets a desired start date 136 and a desired start time 138. In certain embodiments, the processor 112 of the thermostat 110 sets desired start date 136 and the desired start time 138 in response to the user 104 choosing desired start date 136 and the desired start time 138 on the display 114 of the thermostat 110. In other embodiments, the processor 112 of the thermostat 110 sets desired start date 136 and the desired start time 138 in response to receiving from the user device 106 of the user 104 an instruction 188 to set the desired start date 136 and the desired start time 138.

The processor 112 of the thermostat 110 determines a current date 142. In response to determining that the current date 142 matches the desired start date 136, the processor 112 of the thermostat 110 determines a current time 144. In response to determining that the current time 144 matches the desired start time 138, the processor 112 of the thermostat 110 performs the air cleaning process in the purge mode.

While performing an air cleaning process in a fixed-duration mode, the processor 112 of the thermostat 110 performs operations similar to operations performed in the purge mode. In distinction with the purge mode, the processor 112 of the thermostat 110 sets a desired cleaning time 134 and a desired air changes (AC) 132 to desired values in fixed-duration mode. The desired AC 132 may be in a range from 1 AC to 6 AC.

An Example Air Cleaning Process

Figure 2:
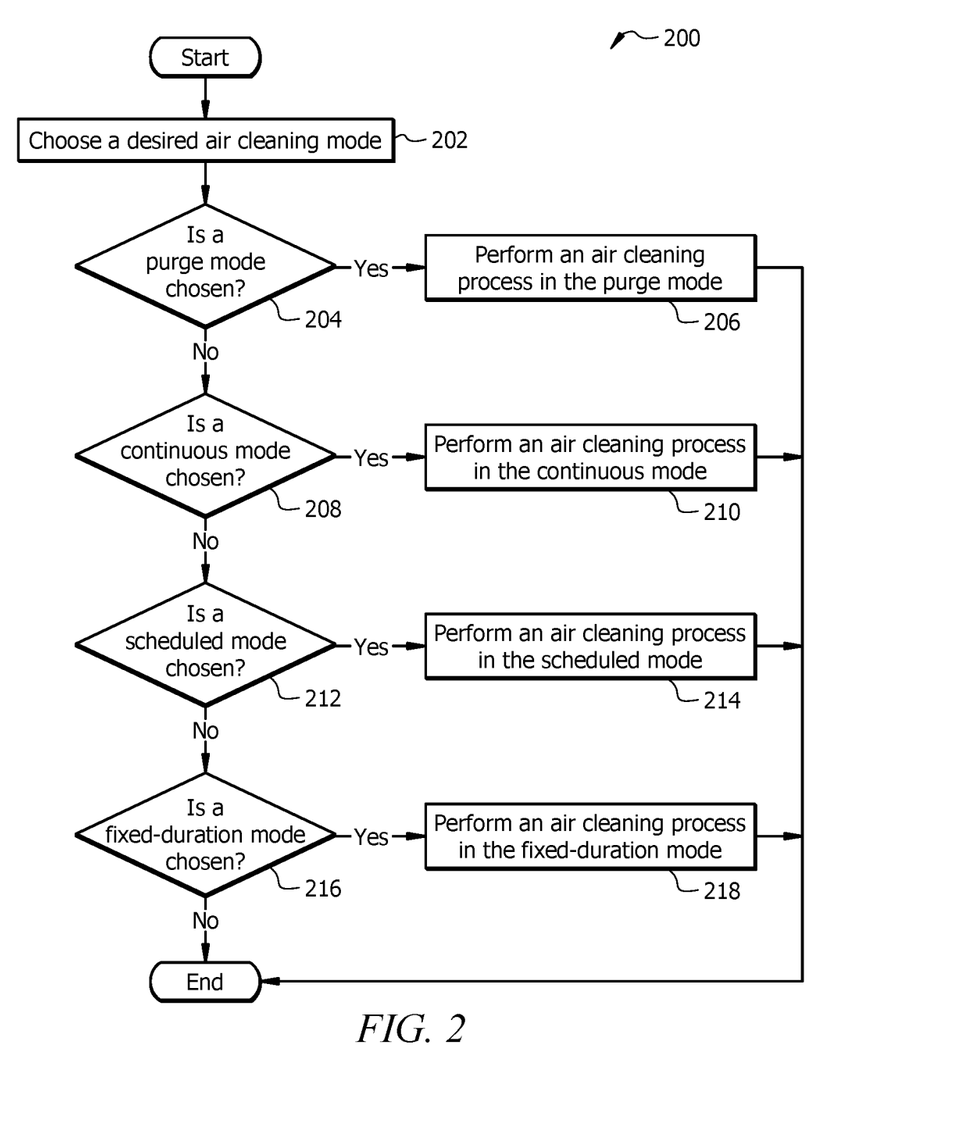
FIG. 2 illustrates a flowchart of an embodiment of an air cleaning processes.

FIG. 2 illustrates a flowchart of an embodiment of an air cleaning process 200. Modifications, additions, or omissions may be made to air cleaning process 200. Air cleaning process 200 may include more, fewer, or other operations. For example, operations may be performed in parallel or in any suitable order. For example, one or more operations of air cleaning process 200 may be implemented, at least in part, in the form of the software instructions (e.g., instructions 120 of FIG. 1), stored on non-transitory, tangible, computer-readable medium (e.g., memory 118 of FIG. 1) that when executed by one or more processors (e.g., processor 112 of FIG. 1) may cause the one or more processors to perform operations 202-218.

Air cleaning process 200 starts with operation 202, where a user 104 chooses a desired air cleaning mode 128 from air cleaning modes 122. The air cleaning modes 122 include a purge mode, a continuous mode, a scheduled mode and a fixed-duration mode. In certain embodiments, the user 104 may chose the desired air cleaning mode 128 from the air cleaning modes 122 displayed by a display 114 of a thermostat 110. In other embodiments, a user device 106 of the user 104 sends an instruction 188 to the thermostat 110. The instruction 188 instructs the thermostat 110 to choose the desired air cleaning mode 128 from the air cleaning modes 122.

At operation 204, a processor 112 of the thermostat 110 determines if a purge mode is chosen. In response to determining at operation 204 that the purge mode is chosen, air cleaning process 200 continues to operation 206. At operation 206, the processor 112 of the thermostat 110 performs an air cleaning process in the purge mode. In certain embodiments, the air cleaning process in the purge mode may be implemented by an air cleaning process 300 described below with reference to FIG. 3.

In response to determining at operation 204 that the purge mode is not chosen, air cleaning process 200 continues to operation 208. At operation 208, the processor 112 of the thermostat 110 determines if a continuous mode is chosen.

In response to determining at operation 208 that the continuous mode is chosen, air cleaning process 200 continues to operation 210. At operation 210, the processor 112 of the thermostat 110 performs an air cleaning process in the continuous mode. In certain embodiments, the air cleaning process in the continuous mode may be implemented by an air cleaning process 400 described below with reference to FIG. 4.

In response to determining at operation 208 that the continuous mode is not chosen, air cleaning process 200 continues to operation 212. At operation 212, the processor 112 of the thermostat 110 determines if a scheduled mode is chosen.

In response to determining at operation 212 that the scheduled mode is chosen, air cleaning process 200 continues to operation 214. At operation 214, the processor 112 of the thermostat 110 performs an air cleaning process in the scheduled mode. In certain embodiments, the air cleaning process in the scheduled mode may be implemented by an air cleaning process 500 described below with reference to FIG. 5.

In response to determining at operation 212 that the scheduled mode is not chosen, air cleaning process 200 continues to operation 216. At operation 216, the processor 112 of the thermostat 110 determines if a fixed-duration mode is chosen.

In response to determining at operation 216 that the fixed-duration mode is chosen, air cleaning process 200 continues to operation 218. At operation 218, the processor 112 of the thermostat 110 performs an air cleaning process in the fixed-duration mode. In certain embodiments, the air cleaning process in the fixed-duration mode may be implemented by an air cleaning process 600 described below with reference to FIG. 6. After performing operation 218 or in response to determining at operation 216 that the fixed-duration mode is not chosen, air cleaning process 200 ends.

An Example Air Cleaning Process in a Purge Mode

Figure 3:
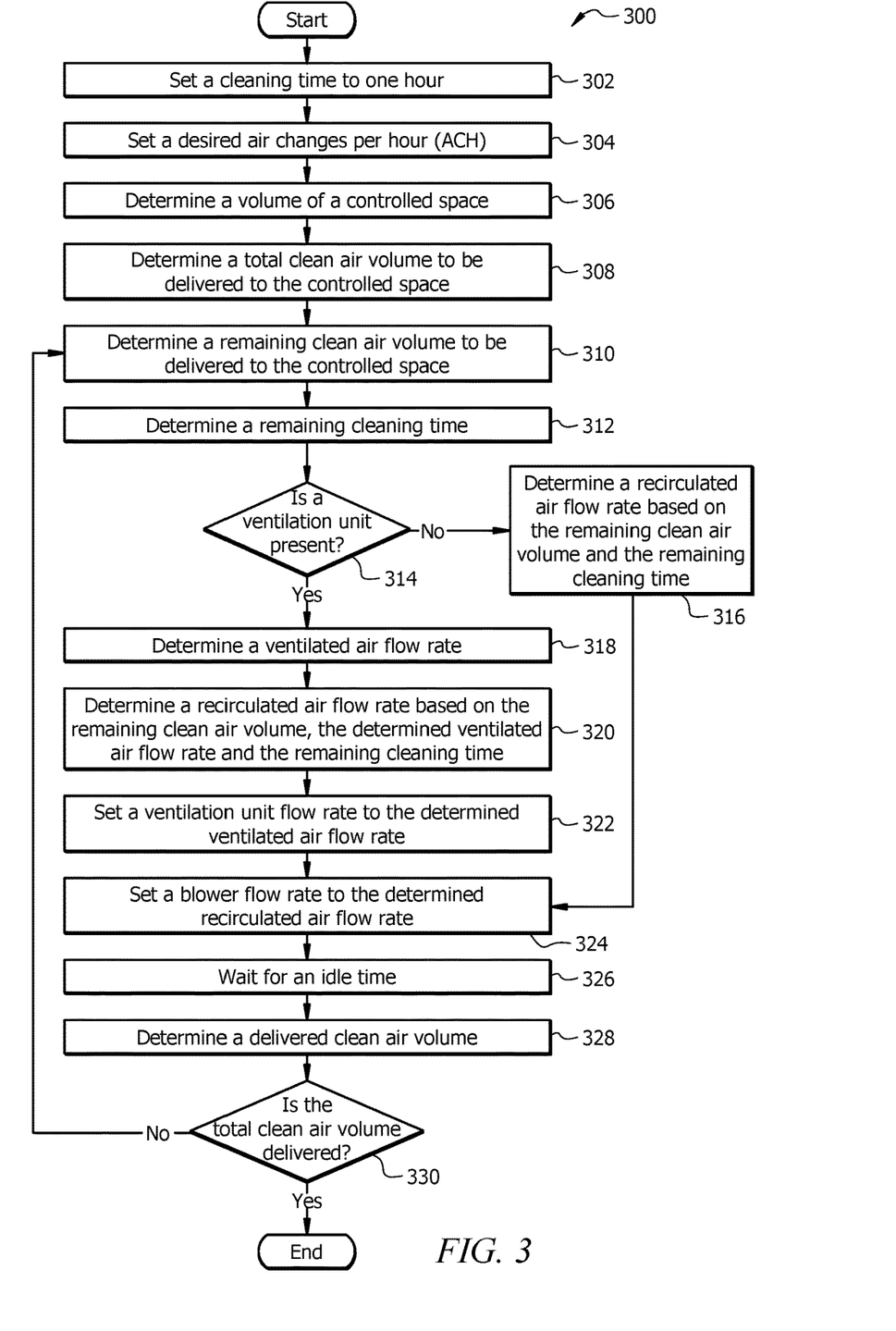
FIG. 3 illustrates a flowchart of an embodiment of an air cleaning processes in a purge mode.

FIG. 3 illustrates a flowchart of an embodiment of an air cleaning process 300 in a purge mode. Modifications, additions, or omissions may be made to air cleaning process 300. Air cleaning process 300 may include more, fewer, or other operations. For example, operations may be performed in parallel or in any suitable order. For example, one or more operations of air cleaning process 300 may be implemented, at least in part, in the form of the software instructions (e.g., instructions 120 of FIG. 1), stored on non-transitory, tangible, computer-readable medium (e.g., memory 118 of FIG. 1) that when executed by one or more processors (e.g., processor 112 of FIG. 1) may cause the one or more processors to perform operations 302-330.

Air cleaning process 300 starts with operation 302, where a processor 112 of a thermostat 110 sets a cleaning time 134 to one hour.

At operation 304, the processor 112 of the thermostat 110 sets a desired air changes per hour (ACH) 130. The desired ACH 130 may be in a range from 1 ACH to 6 ACH. In certain embodiments, the processor 112 of the thermostat 110 sets the desired ACH 130 in response to the user 104 choosing the desired ACH 130 on a display 114 of the thermostat 110. In other embodiments, the processor 112 of the thermostat 110 sets the desired ACH 130 in response to receiving from the user device 106 of the user 104 an instruction 188 to set the desired ACH 130.

At operation 306, the processor 112 of the thermostat 110 determines a volume 126 of the controlled space 108. In certain embodiments, the processor 112 of the thermostat 110 reads the volume 126 of the controlled space 108 from a memory 118 of the thermostat 110. In other embodiments, the processor 112 of the thermostat 110 determines the volume 126 of the controlled space 108 by multiplying an area of the controlled space 108 by a ceiling height of the controlled space 108.

At operation 308, the processor 112 of the thermostat 110 determines a total clean air volume 146 to be delivered to the controlled space 108. In certain embodiments, the total clean air volume 146 is determined from Equation 1

$$V_t = V_s \times ACH \times T_c,$$

where $V_t$ is the total clean air volume 146, $V_s$ is the volume 126 of the controlled space 108, ACH is the desired ACH 130, and $T_c$ is the cleaning time 134.

At operation 310, the processor 112 of the thermostat 110 determines a remaining clean air volume 150 to be delivered to the controlled space 108. The remaining clean air volume 150 is determined by subtracting a delivered clean air volume 148 from the total clean air volume 146.

At operation 312, the processor 112 of the thermostat 110 determines a remaining cleaning time 160.

At operation 314, the processor 112 of the thermostat 110 determines if a ventilation unit 162 is present in the HVAC system 100.

In response to determining at operation 314 that the ventilation unit 162 is not present in the HVAC system 100, air cleaning process 300 continues to operation 316. At operation 316, the processor 112 of the thermostat 110 determines a recirculated air flow rate 156 based on the remaining clean air volume 150 and the remaining cleaning time 160. In certain embodiments, the recirculated air flow rate 156 may be determined from Equation 2

$$V_r = FE \times R_r \times T_r,$$

where $V_r$ is the remaining clean air volume 150, FE is a filter efficiency 124 of the filter 166, $R_r$ is the recirculated air flow rate 156, and $T_r$ is the remaining cleaning time 160. After performing operation 316, air cleaning process 300 continues to operation 324.

In response to determining at operation 314 that the ventilation unit 162 is present in the HVAC system 100, air cleaning process 300 continues to operation 318. At operation 318, the processor 112 of the thermostat 110 determines a ventilated air flow rate 158. In certain embodiments when the ventilation unit 162 is a fixed flow rate unit, the processor 112 of the thermostat 110 reads the ventilated air flow rate 158 from the memory 118 of the thermostat 110.

At operation 320, the processor 112 of the thermostat 110 determines a recirculated air flow rate 156 based on the remaining clean air volume 150, the determined ventilated air flow rate 158, and the remaining cleaning time 160. In certain embodiments, the recirculated air flow rate 156 may be determined from Equation 3

$$V_r = R_v \times T_r + FE \times R_r \times T_r,$$

where $V_r$ is the remaining clean air volume 150, FE is the filter efficiency 124 of the filter 166, $R_r$ is the recirculated air flow rate 156, $R_v$ is the ventilated air flow rate 158, and $T_r$ is the remaining cleaning time 160.

At operation 322, the processor 112 of the thermostat 110 sets a ventilation unit flow rate 154 to the determined ventilated air flow rate 158.

After performing operations 316 or 322, air cleaning process 300 continues to operation 324. At operation 324, the processor 112 of the thermostat 110 sets a blower flow rate 152 to the determined recirculated air flow rate 156.

At operation 326, the processor 112 of the thermostat 110 waits for an idle time 140. The idle time 140 may be in a range from 1 min to 20 min. By waiting for the idle time 140, air cleaning process 300 allows the thermostat 110 to perform various operations based on comfort demands of the user 104. In certain embodiments, the blower flow rate 152 does not remain unchanged during the idle time 140 depending on comfort demands of the user 104. For example, if a cooling demand has been met, the processor 112 of the thermostat 110 may instruct the blower 164 to reduce the blower flow rate 152. For another example, if the blower flow rate 152 is not sufficient to meet the desired cooling demand, the processor 112 of the thermostat 110 may instruct the blower 164 to increase the blower flow rate 152.

At operation 328, the processor 112 of the thermostat 110 determines a delivered clean air volume 148.

At operation 330, the processor 112 of the thermostat 110 determines if the total clean air volume 146 is delivered into the controlled space 108.

In response to determining at operation 330 that the total clean air volume 146 is not delivered into the controlled space 108, air cleaning process 300 goes back to operation 310. In certain embodiments, operation 310 through 330 may be repeated one or more times until the total clean air volume 146 is delivered to the controlled space 108. In response to determining at operation 330 that the total clean air volume 146 is delivered to the controlled space 108, air cleaning process 300 ends.

An Example Air Cleaning Process in a Continuous Mode

Figure 4:
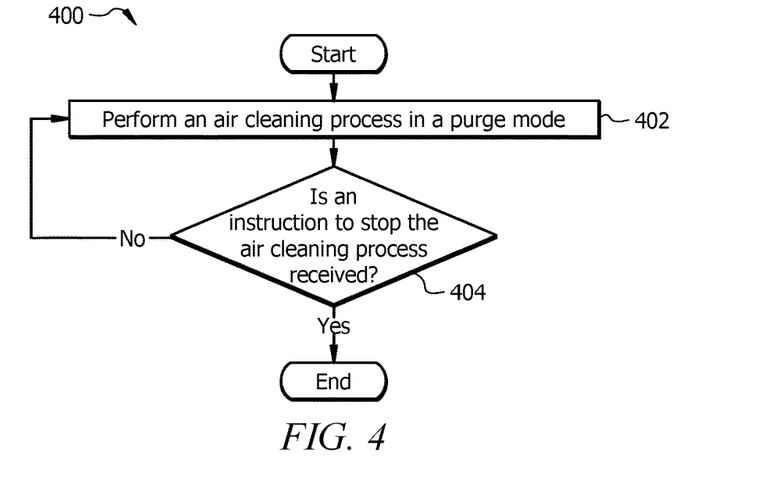
FIG. 4 illustrates a flowchart of an embodiment of an air cleaning processes in a continuous mode.

FIG. 4 illustrates a flowchart of an embodiment of an air cleaning process 400 in a continuous mode. Modifications, additions, or omissions may be made to air cleaning process 400. Air cleaning process 400 may include more, fewer, or other operations. For example, operations may be performed in parallel or in any suitable order. For example, one or more operations of air cleaning process 400 may be implemented, at least in part, in the form of the software instructions (e.g., instructions 120 of FIG. 1), stored on non-transitory, tangible, computer-readable medium (e.g., memory 118 of FIG. 1) that when executed by one or more processors (e.g., processor 112 of FIG. 1) may cause the one or more processors to perform operations 402 and 404.

Air cleaning process 400 starts with operation 402, where a processor 112 of a thermostat 110 performs an air cleaning process in a purge mode. In certain embodiments, operation 402 performs air cleaning process 300 described above with reference to FIG. 3.

At operation 404, the processor 112 of the thermostat 110 determines if an instruction 188 to stop the air cleaning process is received. In response to determining at operation 404 that the instruction 188 to stop the air cleaning process is not received, air cleaning process 400 goes back to operation 402. In certain embodiments, operations 402 and 404 are repeated one or more times until the instruction 188 to stop the air cleaning process is received. During air cleaning process 400, the total clean air volume 146 is delivered to the controlled space 108 one or more times. In response to determining at operation 404 that the instruction 188 to stop the air cleaning process is received, air cleaning process 400 ends.

An Example Air Cleaning Process in a Scheduled Mode

Figure 5:
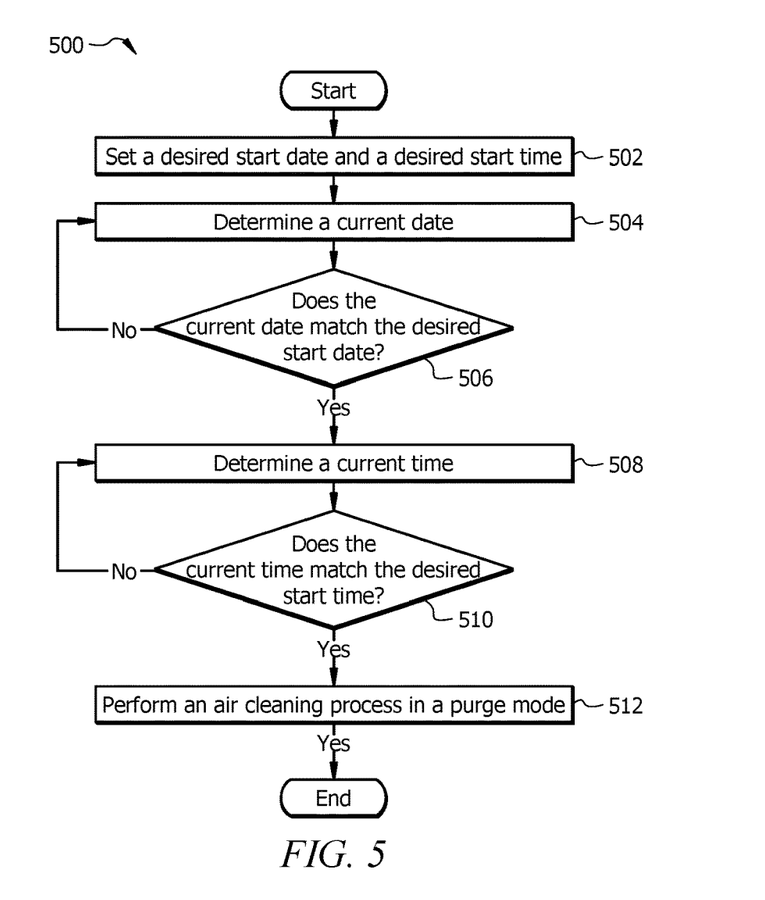
FIG. 5 illustrates a flowchart of an embodiment of an air cleaning processes in a scheduled mode.

FIG. 5 illustrates a flowchart of an embodiment of an air cleaning process 500 in a scheduled mode. Modifications, additions, or omissions may be made to air cleaning process 500. Air cleaning process 500 may include more, fewer, or other operations. For example, operations may be performed in parallel or in any suitable order. For example, one or more operations of air cleaning process 500 may be implemented, at least in part, in the form of the software instructions (e.g., instructions 120 of FIG. 1), stored on non-transitory, tangible, computer-readable medium (e.g., memory 118 of FIG. 1) that when executed by one or more processors (e.g., processor 112 of FIG. 1) may cause the one or more processors to perform operations 502-512.

Air cleaning process 500 starts with operation 502, where a processor 112 of a thermostat 110 sets a desired start date 136 and a desired start time 138. In certain embodiments, the processor 112 of the thermostat 110 sets the desired start date 136 and the desired start time 138 in response to the user 104 choosing the desired start date 136 and the desired start time 138 on a display 114 of the thermostat 110. In other embodiments, the processor 112 of the thermostat 110 sets the desired start date 136 and the desired start time 138 in response to receiving from a user device 106 of a user 104 an instruction 188 to set the desired start date 136 and the desired start time 138.

At operation 504, the processor 112 of the thermostat 110 determines a current date 142.

At operation 506, the processor 112 of the thermostat 110 determines if the current date 142 matches the desired start date 136.

In response to determining at operation 506 that the current date 142 does not match the desired start date 136, air cleaning process 500 goes back to operation 504.

In certain embodiments, operations 504 and 506 are repeated one or more times until the current date 142 matches the desired start date 136.

In response to determining at operation 506 that the current date 142 matches the desired start date 136, air cleaning process 500 continues to operation 508. At operation 508, the processor 112 of the thermostat 110 determines a current time 144.

At operation 510, the processor 112 of the thermostat 110 determines if the current time 144 matches the desired start time 138.

In response to determining at operation 510 that the current time 144 does not match the desired start time 138, air cleaning process 500 goes back to operation 508. In certain embodiments, operations 508 and 510 are repeated one or more times until the current time 144 matches the desired start time 138.

In response to determining at operation 510 that the current time 144 matches the desired start time 138, air cleaning process 500 continues to operation 512. At operation 512, the processor 112 of the thermostat 110 performs an air cleaning process in a purge mode. In certain embodiments, operation 512 performs air cleaning process 300 described above with reference to FIG. 3. After performing operation 512, air cleaning process 500 ends.

An Example Air Cleaning Process in a Fixed-Duration Mode

Figure 6:
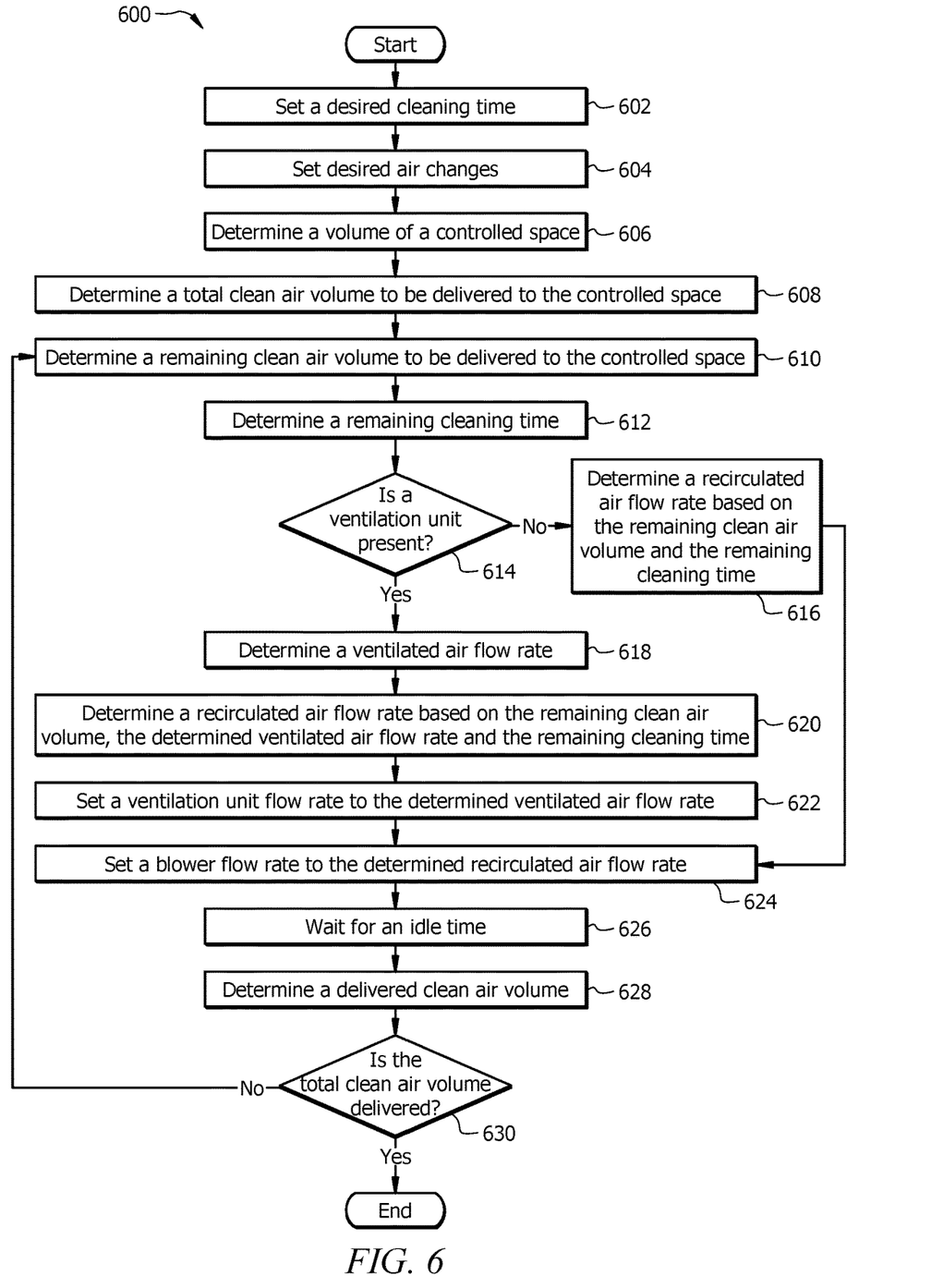
FIG. 6 illustrates a flowchart of an embodiment of an air cleaning processes in a fixed-duration mode.

FIG. 6 illustrates a flowchart of an embodiment of an air cleaning process 600 in a fixed-duration mode. Modifications, additions, or omissions may be made to air cleaning process 600. Air cleaning process 600 may include more, fewer, or other operations. For example, operations may be performed in parallel or in any suitable order. For example, one or more operations of air cleaning process 600 may be implemented, at least in part, in the form of the software instructions (e.g., instructions 120 of FIG. 1), stored on non-transitory, tangible, computer-readable medium (e.g., memory 118 of FIG. 1) that when executed by one or more processors (e.g., processor 112 of FIG. 1) may cause the one or more processors to perform operations 602-630.

Air cleaning process 600 starts with operation 602, where a processor 112 of a thermostat 110 sets a desired cleaning time 134. In certain embodiments, the processor 112 of the thermostat 110 sets the desired cleaning time 134 in response to a user 104 choosing the desired cleaning time 134 on the display 114 of the thermostat 110. In other embodiments, the processor 112 of the thermostat 110 sets the desired cleaning time 134 in response to receiving from a user device 106 of the user 104 an instruction 188 to set the desired cleaning time 134.

At operation 604, the processor 112 of the thermostat 110 sets a desired air change (AC) 132. The desired AC 132 may be in a range from 1 AC to 6 AC. In certain embodiments, the processor 112 of the thermostat 110 sets the desired AC 132 in response to the user 104 choosing the desired AC 132 on a display 114 of the thermostat 110. In other embodiments, the processor 112 of the thermostat 110 sets the desired AC 132 in response to receiving from the user device 106 of the user 104 an instruction 188 to set the desired AC 132.

At operation 606, the processor 112 of the thermostat 110 determines a volume 126 of the controlled space 108. In certain embodiments, the processor 112 of the thermostat 110 reads the volume 126 of the controlled space 108 from the memory 118 of the thermostat 110. In other embodiments, the processor 112 of the thermostat 110 determines the volume 126 of the controlled space 108 by multiplying an area of the controlled space 108 by a ceiling height of the controlled space 108.

At operation 608, the processor 112 of the thermostat 110 determines a total clean air volume 146 to be delivered to the controlled space 108. In certain embodiments, the total clean air volume 146 is determined from Equation 4

$$V_t = V_s \times AC,$$

where $V_t$ is the total clean air volume 146, $V_s$ is the volume 126 of the controlled space 108 and AC is the desired AC 132.

At operation 610, the processor 112 of the thermostat 110 determines a remaining clean air volume 150 to be delivered to the controlled space 108. The remaining clean air volume 150 is determined by subtracting a delivered clean air volume 148 from the total clean air volume 146.

At operation 612, the processor 112 of the thermostat 110 determines a remaining cleaning time 160.

At operation 614, the processor 112 of the thermostat 110 determines if a ventilation unit 162 is present in the HVAC system 100.

In response to determining at operation 614 that the ventilation unit 162 is not present in the HVAC system 100, air cleaning process 600 continues to operation 616. At operation 616, the processor 112 of the thermostat 110 determines a recirculated air flow rate 156 based on the remaining clean air volume 150 and the remaining cleaning time 160. In certain embodiments, the recirculated air flow rate 156 may be determined from Equation 2

$$V_r = FE \times R_r \times T_r,$$

where $V_r$ is the remaining clean air volume 150, FE is a filter efficiency 124 of the filter 166, $R_r$ is the recirculated air flow rate 156, and $T_r$ is the remaining cleaning time 160. After performing operation 616, air cleaning process 600 continues to operation 624.

In response to determining at operation 614 that the ventilation unit 162 is present in the HVAC system 100, air cleaning process 600 continues to operation 618. At operation 618, the processor 112 of the thermostat 110 determines a ventilated air flow rate 158. In certain embodiments when the ventilation unit 162 is a fixed flow rate unit, the processor 112 of the thermostat 110 reads the ventilated air flow rate 158 from the memory 118 of the thermostat 110.

At operation 620, the processor 112 of the thermostat 110 determines a recirculated air flow rate 156 based on the remaining clean air volume 150, the determined ventilated air flow rate 158 and the remaining cleaning time 160. In certain embodiments, the recirculated air flow rate 156 may be determined from Equation 3

$$V_r = R_v \times T_r + FE \times R_r \times T_r,$$

where $V_r$ is the remaining clean air volume 150, FE is the filter efficiency 124 of the filter 166, $R_r$ is the recirculated air flow rate 156, $R_v$ is the ventilated air flow rate 158, and $T_r$ is the remaining cleaning time 160.

At operation 622, the processor 112 of the thermostat 110 sets a ventilation unit flow rate 154 to the determined ventilated air flow rate 158.

After performing operations 616 or 622, air cleaning process 600 continues to operation 624. At operation 624, the processor 112 of the thermostat 110 sets a blower flow rate 152 to the determined recirculated air flow rate 156.

At operation 626, the processor 112 of the thermostat 110 waits for an idle time 140. The idle time 140 may be in a range from 1 min to 20 min. By waiting for the idle time 140, air cleaning process 600 allows the thermostat 110 to perform various operations based on comfort demands of the user 104. In certain embodiments, the blower flow rate 152 does not remain unchanged during the idle time 140 depending on comfort demands of the user 104. For example, if a cooling demand has been met, the processor 112 of the thermostat 110 may instruct the blower 164 to reduce the blower flow rate 152. For another example, if the blower flow rate 152 is not sufficient to meet the desired cooling demand, the processor 112 of the thermostat 110 may instruct the blower 164 to increase the blower flow rate 152.

At operation 628, the processor 112 of the thermostat 110 determines a delivered clean air volume 148.

At operation 630, the processor 112 of the thermostat 110 determines if the total clean air volume 146 is delivered into the controlled space 108.

In response to determining at operation 630 that the total clean air volume 146 is not delivered into the controlled space 108, air cleaning process 600 goes back to operation 610. In certain embodiments, operation 610 through 630 may be repeated one or more times until the total clean air volume 146 is delivered into the controlled space 108. In response to determining at operation 630 that the total clean air volume 146 is delivered, air cleaning process 600 ends. In certain embodiments when the desired cleaning time 134 is set to one hour, air cleaning process 600 performs air cleaning process 300 (see FIG. 3).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a thermostat communicatively coupled a heating, ventilation, and air conditioning (HVAC) system, wherein the thermostat comprises:
a memory configured to store an idle time; and
a processor communicatively coupled to the memory, wherein the processor is configured to:
set a desired cleaning time;
set desired air changes;
determine a volume of a controlled space;
determine a total clean air volume to be delivered to the controlled space based on the volume of the controlled space and the desired air changes;
(a) determine a remaining clean air volume to be delivered to the controlled space;
(b) determine a remaining cleaning time;
(c) in response to determining that a ventilation unit is not present in the HVAC system:
determine a recirculated air flow rate based on the remaining clean air volume and the remaining cleaning time;
set a blower flow rate to the determined recirculated air flow rate;
wait for the idle time; and
determine a delivered clean air volume already delivered to the controlled space; and
repeat operations (a), (b), and (c) until the total clean air volume is delivered to the controlled space.

2. The system of claim 1, wherein the processor is configured to:
(d) in response to determining that the ventilation unit is present in the HVAC system:
determine a ventilated air flow rate;
determine the recirculated air flow rate based on the remaining clean air volume, the determined ventilated air flow rate, and the remaining cleaning time;
set a ventilation unit flow rate to the determined ventilated air flow rate;
set the blower flow rate to the determined recirculated air flow rate;
wait for the idle time; and
determine the delivered clean air volume already delivered to the controlled space; and
repeat operations (a), (b), and (d) until the total clean air volume is delivered to the controlled space.

3. The system of claim 2, wherein:
the memory further stores a filter efficiency; and
the recirculated air flow rate is determined based on the remaining clean air volume, the determined ventilated air flow rate, the remaining cleaning time, and the filter efficiency.

4. The system of claim 1, wherein:
the memory further stores a filter efficiency; and
the recirculated air flow rate is determined based on the remaining clean air volume, the remaining cleaning time, and the filter efficiency.

5. The system of claim 1, wherein the processor is further configured to:
before setting the desired cleaning time, set a desired start date and a desired start time.

6. The system of claim 1, wherein the processor is further configured to:
deliver the total clean air volume to the controlled space one or more times.

7. The system of claim 1, wherein the desired air changes are in a range from 1 to 6.

8. A method comprising:
setting a desired cleaning time;
setting desired air changes;
determining a volume of a controlled space;
determining a total clean air volume to be delivered to the controlled space based on the volume of the controlled space and the desired air changes;
(a) determining a remaining clean air volume to be delivered to the controlled space;
(b) determining a remaining cleaning time;
(c) in response to determining that a ventilation unit is not present:
determining a recirculated air flow rate based on the remaining clean air volume and the remaining cleaning time;
setting a blower flow rate to the determined recirculated air flow rate;
waiting for an idle time; and determining a delivered clean air volume already delivered to the controlled space; and repeating operations (a), (b), and (c) until the total clean air volume is delivered to the controlled space.

9. The method of claim 8, further comprising:

(d) in response to determining that the ventilation unit is present:

determining a ventilated air flow rate;

determining the recirculated air flow rate based on the remaining clean air volume, the determined ventilated air flow rate, and the remaining cleaning time;

setting a ventilation unit flow rate to the determined ventilated air flow rate;

setting the blower flow rate to the determined recirculated air flow rate;

waiting for the idle time; and determining the delivered clean air volume already delivered to the controlled space; and repeating operations (a), (b), and (d) until the total clean air volume is delivered to the controlled space.

10. The method of claim 9, wherein the recirculated air flow rate is determined based on the remaining clean air volume, the determined ventilated air flow rate, the remaining cleaning time, and a filter efficiency.

11. The method of claim 8, wherein the recirculated air flow rate is determined based on the remaining clean air volume, the remaining cleaning time, and a filter efficiency.

12. The method of claim 8, further comprising:

before setting the desired cleaning time, setting a desired start date and a desired start time.

13. The method of claim 8, further comprising:

delivering the total clean air volume to the controlled space one or more times.

14. The method of claim 8, wherein the desired air changes are in a range from 1 to 6.

15. A non-transitory computer-readable medium storing instructions that, when executed by one or more processors, cause the one or more processors to:

set a desired cleaning time;

set desired air changes;

determine a volume of a controlled space;

determine a total clean air volume to be delivered to the controlled space based on the volume of the controlled space and the desired air changes;

(a) determine a remaining clean air volume to be delivered to the controlled space;

(b) determine a remaining cleaning time;

(c) in response to determining that a ventilation unit is not present:

determine a recirculated air flow rate based on the remaining clean air volume and the remaining cleaning time;

set a blower flow rate to the determined recirculated air flow rate;

wait for an idle time; and determine a delivered clean air volume already delivered to the controlled space; and repeat operations (a), (b), and (c) until the total clean air volume is delivered to the controlled space.

16. The non-transitory computer-readable medium of claim 15, wherein the instructions, when executed by the one or more processors, further cause the one or more processors to:

(d) in response to determining that the ventilation unit is present:

determine a ventilated air flow rate;

determine the recirculated air flow rate based on the remaining clean air volume, the determined ventilated air flow rate, and the remaining cleaning time;

set a ventilation unit flow rate to the determined ventilated air flow rate;

set the blower flow rate to the determined recirculated air flow rate;

wait for the idle time; and determine the delivered clean air volume already delivered to the controlled space; and repeat operations (a), (b), and (d) until the total clean air volume is delivered to the controlled space.

17. The non-transitory computer-readable medium of claim 16, wherein the recirculated air flow rate is determined based on the remaining clean air volume, the determined ventilated air flow rate, the remaining cleaning time, and a filter efficiency.

18. The non-transitory computer-readable medium of claim 15, wherein the recirculated air flow rate is determined based on the remaining clean air volume, the remaining cleaning time, and a filter efficiency.

19. The non-transitory computer-readable medium of claim 15, wherein the instructions, when executed by the one or more processors, further cause the one or more processors to:

before setting the desired cleaning time, set a desired start date and a desired start time.

20. The non-transitory computer-readable medium of claim 15, wherein the instructions, when executed by the one or more processors, further cause the one or more processors to:

deliver the total clean air volume to the controlled space one or more times.

* * * * *